US00RE43496E

(19) United States
(12) Reissued Patent
Cho

(10) Patent Number: US RE43,496 E
(45) **Date of Reissued Patent: *Jun. 26, 2012**

(54) METHOD AND APPARATUS FOR COMPENSATING REPRODUCED AUDIO SIGNALS OF AN OPTICAL DISC

(75) Inventor: Jae Ryong Cho, Yongin-si (KR)

(73) Assignee: LG Electronics Inc., Seoul (KR)

( * ) Notice: This patent is subject to a terminal disclaimer.

(21) Appl. No.: 12/850,600

(22) Filed: Aug. 4, 2010

Related U.S. Patent Documents

Reissue of:
(64) Patent No.: 6,542,564
Issued: Apr. 1, 2003
Appl. No.: 10/055,948
Filed: Jan. 28, 2002

U.S. Applications:
(60) Continuation of application No. 11/930,729, filed on Oct. 31, 2007, now Pat. No. Re. 42,791, which is a division of application No. 09/866,728, filed on May 30, 2001, now Pat. No. 6,408,040, which is a continuation of application No. 08/985,631, filed on Dec. 4, 1997, now abandoned.

(30) Foreign Application Priority Data

Feb. 4, 1997 (KR) ..... 97-3399

(51) Int. Cl.
*H04L 7/00* (2006.01)
*H04L 25/00* (2006.01)
*H04L 25/40* (2006.01)

(52) U.S. Cl. ..... 375/372; 369/60.01

(58) Field of Classification Search ..... 375/373, 375/371, 377; 370/465, 477, 516–517; 386/326, 386/353; 369/60.01
See application file for complete search history.

(56) References Cited

U.S. PATENT DOCUMENTS

| | | | |
|---|---|---|---|
| 4,833,535 | A | 5/1989 | Ozeki et al. |
| 5,148,417 | A | 9/1992 | Wong et al. |
| 5,323,272 | A | 6/1994 | Klingler |
| 5,432,769 | A | 7/1995 | Honjo |
| 5,517,521 | A | 5/1996 | Strawn |
| 5,566,208 | A | 10/1996 | Balakrishnan |
| 5,668,916 | A | 9/1997 | Fujinami |
| 5,710,784 | A | 1/1998 | Kindred et al. |
| 5,748,585 | A | 5/1998 | Tsukamoto et al. |

(Continued)

*Primary Examiner* — Jean B Corrielus
(74) *Attorney, Agent, or Firm* — Birch, Stewart, Kolasch & Birch, LLP

(57) ABSTRACT

An apparatus and method for compensating audio signals to be recorded on an optical disc to optimize usage of memory in an audio decoding circuit, and to neutralize invalid audio data to produce good audio quality. A determination is made with regard to whether audio data signals contain normal data or invalid data. Invalid data is adjusted into normal audio data, and stored in the memory. The volume of the data stored in the memory is monitored to detect overflow and underflow conditions of the memory, a data transmitting stopping signal being sent during an overflow condition of the memory, a data transmitting requesting signal being sent during an underflow condition. The audio data reproduced from the memory is decoded, and the decoded audio data is output. Undesired errors are prevented by monitoring the reproduced audio data for invalid data and by adjusting invalid data into normal data when detected.

3 Claims, 12 Drawing Sheets

U.S. PATENT DOCUMENTS

| | | | |
|---|---|---|---|
| 5,748,588 | A | 5/1998 | Maeda et al. |
| 5,754,241 | A | 5/1998 | Okada et al. |
| 5,758,011 | A | 5/1998 | Fujinami |
| 5,778,218 | A | 7/1998 | Gulick |
| 5,802,239 | A | 9/1998 | Fujinami |
| 5,917,559 | A | 6/1999 | Um |
| 5,917,836 | A | 6/1999 | Ichikawa et al. |
| 5,983,278 | A | 11/1999 | Chong et al. |
| 6,035,092 | A | 3/2000 | Fujinami |
| 6,035,096 | A | 3/2000 | Kusakabe |
| 6,269,061 | B1 | 7/2001 | Shimizume et al. |
| 6,401,228 | B1 | 6/2002 | Ichikawa et al. |

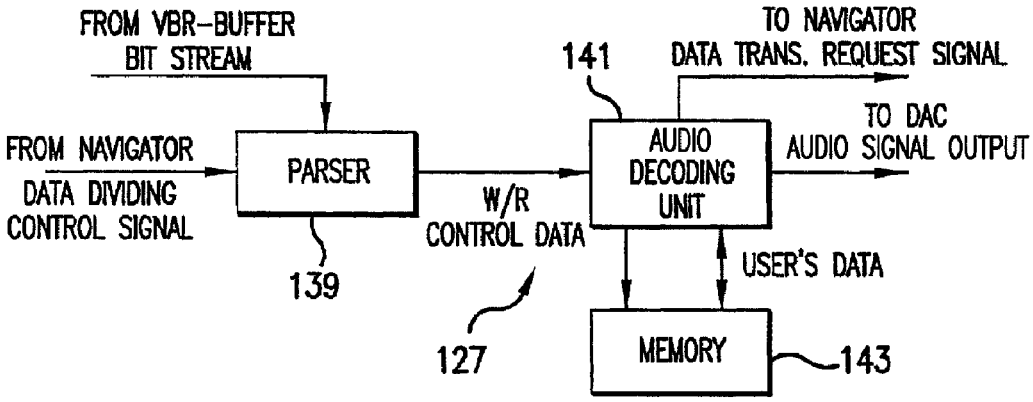
FIG.6
AMENDED

AMENDED

METHOD AND APPARATUS FOR COMPENSATING REPRODUCED AUDIO SIGNALS OF AN OPTICAL DISC

Matter enclosed in heavy brackets [ ] appears in the original patent but forms no part of this reissue specification; matter printed in italics indicates the additions made by reissue.

[This application is a divisional of application Ser. No. 09/866,728, filed on May 30, 2001, now U.S. Pat. No. 6,408,040 which is a continuation of application Ser. No. 08/985,631, filed on Dec. 4, 1997, now abandoned the entire contents of which are hereby incorporated by reference and for which priority is claimed under 35 U.S.C. §120; and this application claims priority of application No. 97-3399 filed in Korea on Feb. 4, 1997 under 35 U.S.C. §119.] *This application is a Continuation Reissue Application of U.S. application Ser. No. 11/930,729 filed Oct. 31, 2007 now U.S. Pat. No. Re. 42,791, which is a reissue of U.S. Pat. No. 6,542,564 B2 issued Apr. 1, 2003 (U.S. application Ser. No. 10/055,948 filed Jan. 28, 2002), which is a divisional of application Ser. No. 09/866, 728 filed on May 30, 2001 (now U.S. Pat. No. 6,408,040), which is a continuation of application Ser. No. 08/985,631 filed on Dec. 4, 1997 (now abandoned), which claims priority benefits of Korean Application No. 97-3399 filed in Republic of Korea on Feb. 4, 1997 under 35 U.S.C. §119. The entire contents of the above-identified U.S. applications are incorporated by reference. Notice: More than one reissue application has been filed for the reissue of U.S. Pat. No. 6,542,564 B2. The reissue applications are application Ser. Nos. 11/930, 729 filed Oct. 31, 2007; 11/932,846 filed Oct. 31, 2007; 11/932,893 filed Oct. 31, 2007; 12/850,590 filed Aug. 4, 2010; 12/850,593 filed Aug. 4, 2010; 12/850,594 filed Aug. 4, 2010; 12/850,600 filed Aug. 4, 2010; 12/850,602 filed Aug. 4, 2010.*

BACKGROUND OF THE INVENTION

1. Field of the Invention

The present invention relates to a method and apparatus for reproducing data from an optical disc and, more particularly, to a method and apparatus for compensating audio signals reproduced from the optical disc.

2. Description of the Prior Art

A Compact Disc (referred to as "CD" hereinafter) is a conventional recording medium which records data digitally. Because data is recorded digitally, it does not deteriorate when reproduced, even if the CD is used repeatedly. However, the CD, which is presently used throughout audio and computer fields, has limited recording capacity that restricts its use in video. A Digital Versatile Disc ("DVD") has been recently developed as a new recording medium suitable for the multi-media age in the recording media market. The DVD is able to store moving images as well as numbers, characters, figures and voices. The DVD has all the advantages of the CD, and has a recording capacity of about 5.2 Gbytes per side. Therefore, a complete conventional movie, including moving images, can be sufficiently recorded on one DVD.

Physically, the DVD is as small and durable as a conventional CD. Furthermore, data stored on the DVD is recorded digitally, rendering it able to be preserved easily. For these reasons, the DVD is an alternative recording medium that has become widely used in the market of recording media including video/audio and computer fields. The wide use of the DVD in image fields has given the DVD a good reputation as an image recording media.

Conventional reproduction apparatuses for reproducing video/audio signals from the DVD, and the operation thereof, are described in detail below with reference to FIGS. 1 to 4C of the attached drawings.

FIG. 1 is a block diagram showing a conventional reproduction apparatus for the optical disc. As shown in FIG. 1, the conventional reproduction apparatus comprises: an optical disc (i.e. DVD) 1 on which video/audio signal data are recorded; an optical pick-up apparatus 3 for reading the data recorded on the optical disc 1; and a motor 11 for rotating the optical disc 1; and a servo-circuit 13 for controlling the motor 11 and the optical pick-up apparatus 3.

The conventional reproduction apparatus further comprises: a micro-processor 15 for managing the overall control of the reproduction apparatus according to a user's request, and for controlling the servo-circuit 13; a navigator 17 for receiving commands from the micro-processor 15, and for executing the commands as to the transmission of data; and a high frequency amplifying circuit 5 for amplifying data read from the optical pick-up apparatus 3 in high frequency bands, and for outputting amplified signals under the control of the navigator 17.

The conventional reproduction apparatus also comprises: an error correcting circuit (ECC) 7 for correcting errors in bit stream of amplified signals output from the high frequency amplifying circuit 5 and for outputting corrected signals under the control of the navigator 17; and a Variable Bit Rate buffer (VBR buffer) 9 for temporarily storing signals output from the error correcting circuit 7 under the control of the navigator 17. The VBR buffer 9 may be a First In First Out (FIFO) buffer.

In addition, the conventional reproduction apparatus comprises a data decoding unit 20 which is composed of a video decoding circuit 21, a graphics circuit 25 and an audio decoding circuit 27. When the bit stream output from the VBR buffer 9 is input to the navigator 17 and the data decoding circuit unit 20, the video decoding circuit 21 extracts only video signal data therefrom and decodes the video signal data based on data dividing control signals of the navigator 17. Similarly, the graphics circuit 25 extracts and decodes only caption signal data, and the audio decoding circuit 27 extracts and decodes only audio signal data.

The video data decoded by the video decoding circuit 21 and the caption signal data decoded by the graphics circuit 25 are mixed in a mixer (not shown in the attached drawings), and then the mixed data is converted into analog signals by a video digital/analog converter 23, which is displayed after being adjusted into broadcasting signals in a NTSC/PAL encoder 31. In the similar manner, the audio data decoded by the audio decoding circuit 27 is converted into analog signals by a audio digital/analog converter 29, which audio data is then synchronized with the video signals and output.

The operation of the conventional reproduction apparatus of the optical disc will be described in the following.

The video/audio data recorded in the DVD is composed of user data and system data. The user data is composed of video data formatted in VBR format which will be processed in the video decoding circuit 21, and audio data which will be processed in the audio decoding circuit 27. The system data is composed of information relating to systematic functions, by which, for example, the video/audio data selected by the user are read from the DVD and transmitted to the audio decoding circuit 27 and video decoding circuit 21 at a suitable rate.

FIG. 2 shows a conventional DVD format. As shown in FIG. 2, the user data recorded in the DVD 1 is composed of the video data and the audio data. By comparison, the recording capacities of the video data and the audio data are arranged such that about 9 frames of the video data are recorded for every one frame (1536 bytes) of audio data. The disparity between audio and video data stored on the disc is a consequence of the disproportionate size of audio and video frames. The video data includes, for example, data corresponding to moving images which generally occupies much more space to than the audio data.

When reproduced from the DVD, the video data and the audio data are adequately amplified. The amplified signals being corrected in the error correcting circuit 7 before being temporarily stored in the VBR buffer 9.

The signals output from the VBR buffer 9 are input into the data decoding unit 20 under the control of the navigator 17, and the data dividing operation is executed in at least one of the decoding circuits of data decoding unit 20. Then, the divided signals are decoded, respectively, by the following process.

FIG. 3A is a detailed circuit diagram of the video decoding circuit 21 illustrated in FIG. 1.

The video decoding circuit 21 comprises a parser 33, a video decoding unit 35 and a memory 37. The parser 33 receives the bit stream from the VBR buffer 9 via a first input terminal and the data dividing control signals from the navigator 17 via a second input terminal. The parser 33 extracts only the video data in accordance with the data dividing control signals, and outputs the video data to the video decoding unit 35. Other video-related signals will be parsed to subsequent stages (such as, the graphics circuit 25 and audio decoding circuit 27). The video decoding unit 35 generates original signals by decoding the video data extracted in the parser 33. The video decoding unit 35 may also temporarily store the decoded data of the original signal in the memory 37, and output the original signals stored in the memory 37. The video decoding unit comprises a control unit (not shown in the attached drawings) for monitoring the storage volume of the data stored in the memory 37, and for outputting a data transmitting request signal to the navigator 17 based on the storage volume of the data stored in memory 37.

In other words the video decoding circuit 21 decodes the video data input from the parser 33, temporarily stores the decoded video data in the memory 37, and outputs signals based on stored data when the data corresponding to a predetermined screen portion are stored. The video decoding circuit 21 also monitors the storage volume of the data stored in the memory 37, in which the data decoded in the video decoding unit 35 are stored. So long as there is memory space in the memory 37, the video decoding unit 35 will decode additional video data by outputting the data transmitting request signal to the navigator 17. However, if the memory 37 is full, the video decoding unit 35 adjusts the input of video data to memory 37 by outputting a data transmitting stopping signal to the navigator 17.

FIG. 3B is the detailed circuit diagram of the audio decoding circuit 27 included in the conventional device illustrated in FIG. 1. The audio decoding circuit 27 comprises a parser 39, an audio decoding unit 41 and a memory 43. The parser 39 receives the bit stream from the video decoding circuit 21 via a first input terminal, and receives the data dividing control signal from the navigator 17 via a second input terminal. The parser extracts only the audio data in accordance with the data dividing control signals. Thereafter, the audio decoding unit 41 decodes the audio data extracted by the parser 39, and temporarily stores the audio data decoded in the memory 43. In other words, the audio decoding circuit 27 decodes the audio data input via the parser 39, temporarily stores the decoded data in the memory 43, and continuously outputs the data stored in the memory 43.

Unlike the video decoding circuit 21, the audio decoding circuit 27 docs not have any means to output a data transmitting request signal or data transmitting stopping signal to the navigator 17. That is, in the conventional reproduction apparatus for the optical disc, the rate at which the data is input into the audio decoding circuit 27 is adjusted only according to the storage volume of the data stored in the memory 37 of the video decoding circuit 21 used to decode the video data.

As mentioned earlier, the size of recorded video data is about 9 times that of recorded audio data, as shown in FIG. 2. The memories 37 and 43 are therefore pre-set so that the ratio of the space of the memory 37 in the video decoding circuit 21 and that of the memory 43 in the audio decoding circuit 27 is also about 9:1. However, audio data is irregularly recorded at various positions on the DVD, and the decoding operation of the video decoding circuit 21 is not always synchronized with the decoding operation of the audio decoding circuit 27. Therefore, if the audio signal data is input into the audio decoding circuit 27 depending on the video decoding circuit 21, audio signals outputted can become discontinuous.

In order to overcome the above problem, the memories 37 and 43 may be designed so that the ratio of recording space in the memory 37 of the video decoding circuit 21 to the recording, space in the memory 43 of the audio decoding circuit 27 is less than 9:1. To achieve this reduced proportion without sacrificing video data memory capacity, the memory 43 of the audio decoding circuit 27 must be made larger. However, in such case, the cost of the apparatus rises and the memory 43 can not be used efficiently.

In addition, since the audio decoding circuit 27 can not generate the data transmitting request and stopping signals independently, the conventional apparatus has another problem in that overflow and/or underflow of the data occurs in the memory 43 of the audio decoding circuit 27.

As shown in FIG. 4A, the length of one frame of the normal audio data being input into the audio decoding circuit 27 is 1536 bytes. The audio decoding circuit 27 in the conventional reproduction apparatus, as shown in FIG. 2, therefore processes the audio data one frame (1536 bytes) at a time. More specifically, before recording the data in the DVD, audio signals are processed (e.g. encoding the audio data or inserting the error correction code in the audio data, etc.) in increments of 1536 bytes. Therefore, the audio decoding circuit 27 also has to perform the data processing operation per 1536 bytes.

However, as shown in FIGS. 4B and 4C, the length of the audio data read from the optical pick-up apparatus 3 may be larger or smaller than the normal length (1536 bytes) due to a disc error or a recording error. In these situations, a further problem will occur since the audio decoding circuit 27 does not decode the audio signal data normally, causing error signals to be generated as described hereinafter.

If the size of the bit stream of the audio data being input into the audio decoding circuit 27 is smaller than 1536 bytes (refer to FIG. 4B), some data of the audio data bit stream of a subsequent frame will be processed together with the data of the present frame, causing errors to be generated. Also, if the bit stream input is larger than 1536 bytes (refer to FIG. 4C), the remaining data after the 1536th byte in the present frame will be processed with the data of the subsequent frame. In both cases, the decoding operation of the audio data can not be performed normally.

SUMMARY OF THE INVENTION

It is an object of the present invention to solve the above-mentioned problems with the conventional reproduction apparatus of the DVD.

It is also an object of the present invention to provide an apparatus and method for compensating reproduced audio signals of the optical disc by which the memory in the audio decoding circuit can be used most efficiently.

It is another object of the present invention to provide an apparatus and method for compensating reproduced audio signals of the optical disc which result from invalid audio data input due, e.g., to disc errors, to reproduce a good quality sound.

One aspect of the present invention is a method and apparatus for compensating invalid audio signals by determining whether an audio data unit has a size that is equal to a predetermined size that is related to a size of a valid audio frame, changing the size of the audio data unit to the predetermined size when it is not equal to the predetermined size, and storing the audio data unit into an audio memory. To determine whether an audio data unit has a size that is equal to a predetermined size, header data within the audio data unit is detected, and a size of the audio data unit following the detected header is compared to the predetermined size.

When the audio data unit is smaller than the predetermined size, the size of the audio data unit may be changed by adding dummy data to the audio data unit. The dummy data may be muted signal data, or data that is representative of audio data included in audio data units previously stored in the audio memory. By contrast, when the audio data unit is larger than the predetermined size, a portion of the audio data unit exceeding the predetermined size may be eliminated, or it may be stored and overwritten with valid audio data unit.

Another aspect of the present invention is a method and apparatus for compensating invalid audio signals by counting a number of bits following a header of an audio data unit, detecting a size of the audio data unit based on the number of bits counted in the counting step, and controlling storage of the audio data unit into an audio memory based on the detected size. When the detected size is smaller than a predetermined size, the storage of the audio data unit is controlled by generating dummy data, and adding the dummy data to the audio data unit or replacing the audio data unit with the dummy data. As such, storage of the audio data unit into the memory is prevented when the detected size is smaller than a predetermined size. By contrast, when the detected size is larger than a predetermined size, at least a portion of audio data corresponding to the audio data unit exceeding the predetermined size is prevented from being stored in the audio memory. In this manner, consecutively received audio data units are stored separately.

Yet another aspect of the present invention is a method and apparatus for controlling storage of audio data to an audio memory based on amount of data stored in that audio memory. Specifically, the method and apparatus detect an amount of data stored in the audio memory, and controlling storage of audio data into the audio memory based on the amount of data stored. The detecting step includes determining whether the amount of data stored in the audio memory is less than a predetermined lower threshold, or greater than a predetermined upper threshold. This can be accomplished by detecting an address of a last audio data unit stored in the memory and comparing that detected address to the predetermined upper and lower thresholds.

If the detected address is less than the predetermined lower threshold, additional audio data may be requested for storage into the audio memory. If additional audio data is not available, data that is representative of previously stored audio data. By contrast, if the detected address is greater than the predetermined upper threshold, a data transmission stopping signal is generated and storage of additional audio data may be stored in the memory is halted.

Further scope of applicability of the present invention will become apparent from the detailed description given hereinafter. However, it should be understood that the detailed description and specific examples, while indicating preferred embodiments of the invention, are given by way of example only, since various changes and modifications within the spirit and scope of the invention will become apparent to those skilled in the art from this detailed description.

BRIEF DESCRIPTION OF THE DRAWINGS

The above and other objects, features and advantages of the present invention will become apparent from the following detailed description with the accompanying drawings, which are given by way of illustration only and thus are not limitative of the present invention, and in which:

FIG. 6 is an internal block diagram showing an audio decoding circuit 127 illustrated in FIG. 5;

DETAILED DESCRIPTION OF THE PREFERRED EMBODIMENTS

Figure 5:
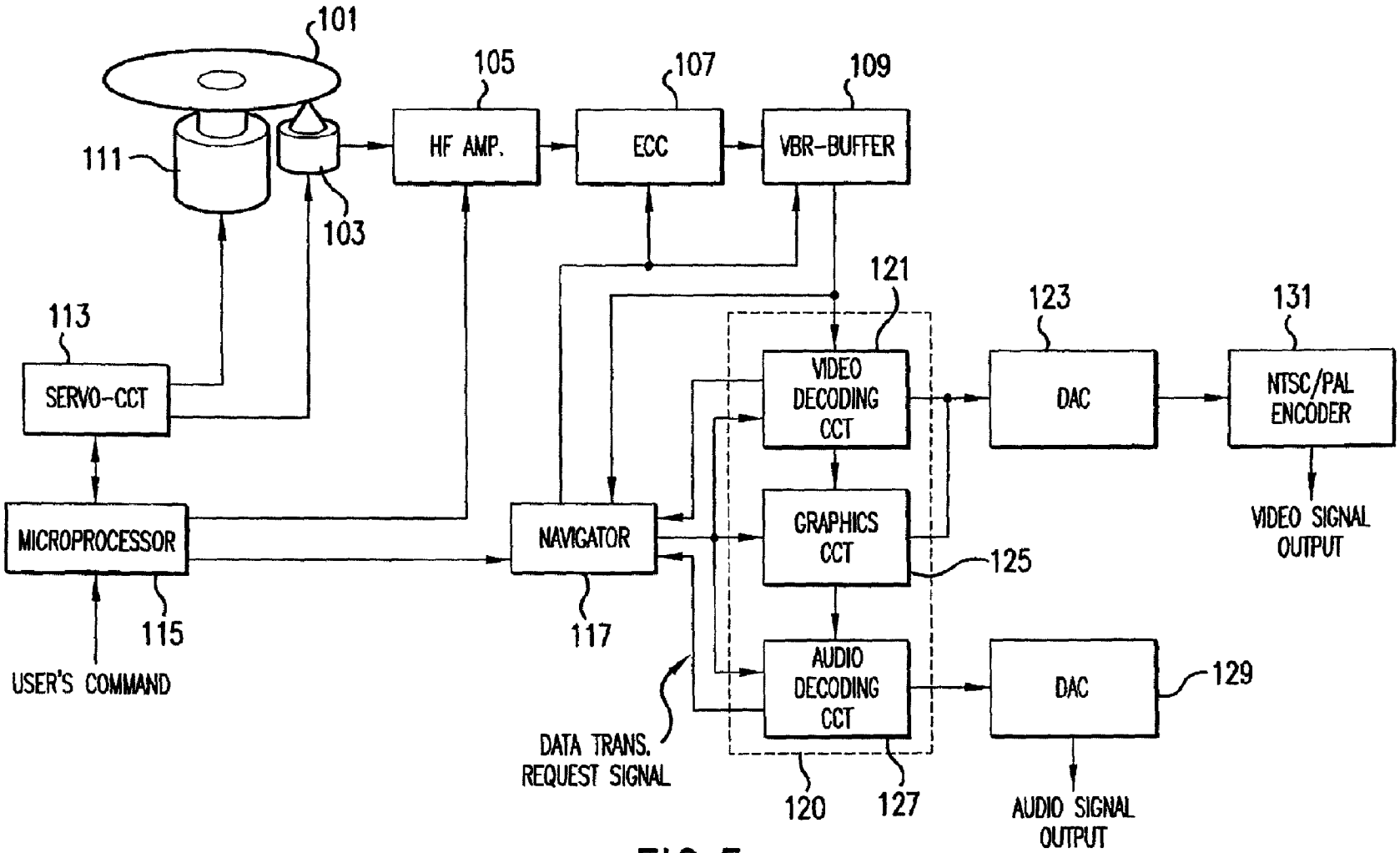
FIG. 5 is a block diagram of the reproduction apparatus of the optical disc according to the present invention.

FIG. 5 is a block diagram of the reproduction apparatus for an optical disc according to the present invention. As shown in FIG. 5, the optical disc reproduction apparatus of the present invention comprises: a DVD 101 on which video/audio signals are recorded; a motor 111 for rotating the DVD 101; an optical pick-up apparatus 103 for reading the signals recorded on the DVD 101; a servo-circuit 113 for driving the motor 111 and the optical pick-up apparatus 103; and a high frequency amplifying circuit 105 for amplifying the signals read from the optical pick-up apparatus 103.

The reproduction apparatus of the present invention also comprises: a micro-processor 115 or other processing device for managing the overall operation of the apparatus upon user's demand, and for controlling the operation of the servo-circuit 113 and the high frequency amplifying circuit 105; and a navigator 117 for receiving control signals from the micro-processor 115 and for controlling data transmission.

Further, the reproduction apparatus of the present invention comprises: an error correcting circuit 107 for correcting errors of bit stream signals output from the high frequency amplifying circuit 105 and for outputting corrected signals under the control of the navigator 117; and a VBR buffer 109 for temporarily storing the signals output from the error correcting circuit 107 under the control of the navigator 117. The VBR buffer 109 may be a First In First Out (FIFO) buffer.

In addition, the reproduction apparatus of the present invention comprises a data decoding unit 120 which includes a video decoding circuit 121, a graphics circuit 125 and an audio decoding circuit 127. The bit stream signals output from the VBR buffer are input into the navigator 117 and the data decoding circuit unit 120. The video decoding circuit 121 extracts only video signals from the bit stream signals input, and decodes them upon receiving data dividing control signals from the navigator 117. Similarly, the graphics circuit 125 extracts and decodes only caption signals, and the audio decoding circuit 127 extracts and decodes only audio signals.

The audio signal data is decoded into audio data by audio decoding circuit 127 using the above described process, and the audio data is converted into audio analog signals which are output synchronously with the video signal by an audio digital/analog signal converter 129. Video data decoded in the video decoding circuit 121 and caption data decoded in the graphics circuit 125 are mixed in a mixer (not shown in the attached drawings). The mixed signal output by the mixer is converted into an analog signal by a video digital/analog signal converter 123. The analog signals are adjusted to broadcasting signals in a NTSC/PAL encoder 131 before being output for display.

The video decoding circuit 121 and the audio decoding circuit 127 are both capable of outputting data transmitting request signals to the navigator 117. The storage of data in the memory included in the video decoding circuit 121 and the audio decoding circuit 127 may be adjusted based on the size of those respective memories.

The video decoding circuit 121 may use its memory most efficiently by outputting the data transmitting request signals to the navigator 117 based on the storage volume of the video data recorded therein.

FIG. 6 is an internal block diagram showing the audio decoding circuit 127 of the present invention which is also able to output the data transmitting request signals according to the present invention.

According to FIG. 5, the audio decoding circuit 127 preferably outputs the data transmitting request signal to the navigator 117.

The audio decoding circuit 127 of the reproduction apparatus of the present invention comprises a parser 139, an audio decoding unit 141 and a memory 143. The parser 139 receives a bit stream from the VBR buffer 109 via a first input terminal and the data dividing control signals from the navigator 117 via a second input terminal. The bit stream may be received from VBR buffer 109 directly, or after being passed through one or more of video decoding circuit 121 and graphics circuit 125, as shown in FIG. 5. Parser 139 extracts audio data from the bit stream based on the data dividing control signal from navigator 117, and outputs that extracted audio signal to the audio decoding unit 141. The parser 139 of audio decoding circuit 120 passes other, non-extracted signals.

The audio decoding unit 141 within audio decoding circuit 120 generates audio data which corresponds to the original audio signals by decoding the audio signals extracted by the parser 139. The audio decoding unit 141 also executes data read/write operations. For example, the audio decoding unit 141 may temporarily write the audio data in the memory 143, or it may read and output the audio data recorded in the memory 143. The audio decoding unit 141 may also monitor the storage volume of the audio data stored in the memory 143 and output the data transmitting request signals to the navigator 117 accordingly.

Figure 7:
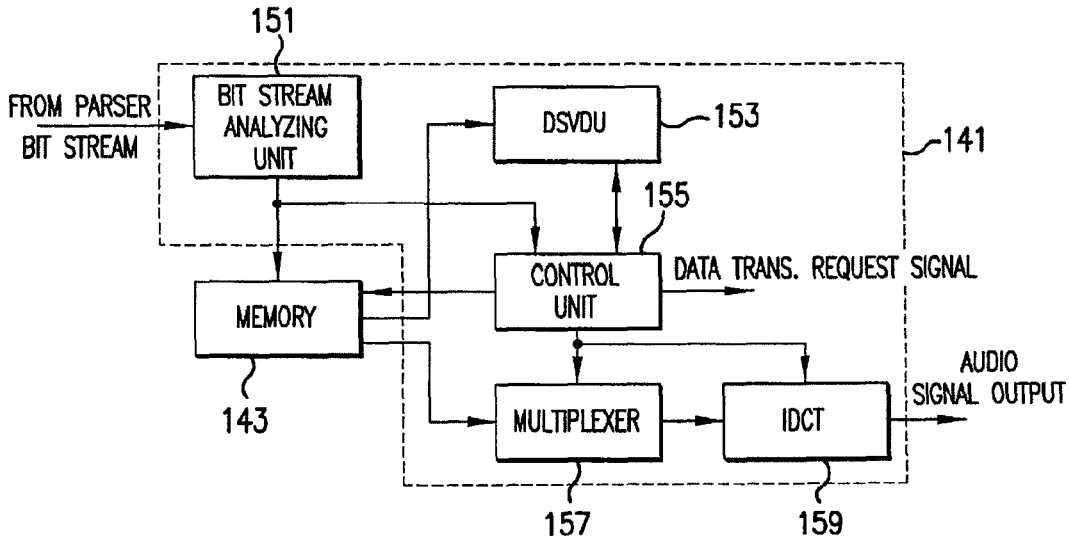
FIG. 7 is a detailed block diagram showing an audio decoding unit 141 illustrated in FIG. 6.

FIG. 7 is a detailed block diagram showing the audio decoding unit 141 illustrated in FIG. 6. The audio decoding unit 141 may comprise a bit stream analyzing unit 151 for receiving and analyzing the bit stream output from the parser 139; and a data storage volume detecting unit (DSVDU) 153 for detecting the storage volume of the audio data stored in the memory 143 which includes audio data analyzed in the bit stream analyzing unit 151.

The audio decoding unit 141 may also comprise a control unit 155 for acknowledging the storage volume of the audio data stored in the memory 143 upon receiving signals output from the data storage volume detecting unit 153, and for outputting an audio data transmitting request signal or an audio data transmitting stopping signal to the navigator 117 based on the acknowledged storage volume. The control unit 155 also determines whether the audio data being analyzed in the bit stream analyzing unit 151 is invalid data or normal data. This determination can be made by, e.g., counting the number of bytes included in the received audio data and comparing that number to a number of bytes in a normal audio data unit. The control unit 155 controls the read/write operation of the audio data output from the bit stream analyzing unit 151 in accordance with the storage volume of the audio data of the memory 143. The control unit 155 also controls the operations of other circuit subunits (not shown in the attached drawings) included in the audio decoding unit 141.

Under the control of the control unit 155, the audio data of one normal frame being output from the memory 143 is decoded by a multiplexer 157 and an Inverse Discrete cosine ConverTing unit (IDCT) 159 according to the time-frequency converting method, and then the decoded audio data is output. As seen in FIG. 5, the audio signal data output through the IDCT 159 is converted by the audio digital/analog signal converter 129 into audio analog signals, which are output through a speaker or other audio output device (not shown in the attached drawings).

In other words, the audio decoding unit 141 adjusts the rate which the audio signals are being input thereto. Audio decoding unit 141 is therefore able to decode the audio signals typically associated with one normal frame by generating the data transmitting request signal or the data transmitting stopping signal based on the bytes counting operation performed by the control unit 155, and by acknowledging the storage volume of the audio data stored in the memory 143 in accordance with the detecting signal of the data storage volume detecting unit 153.

Figure 8:
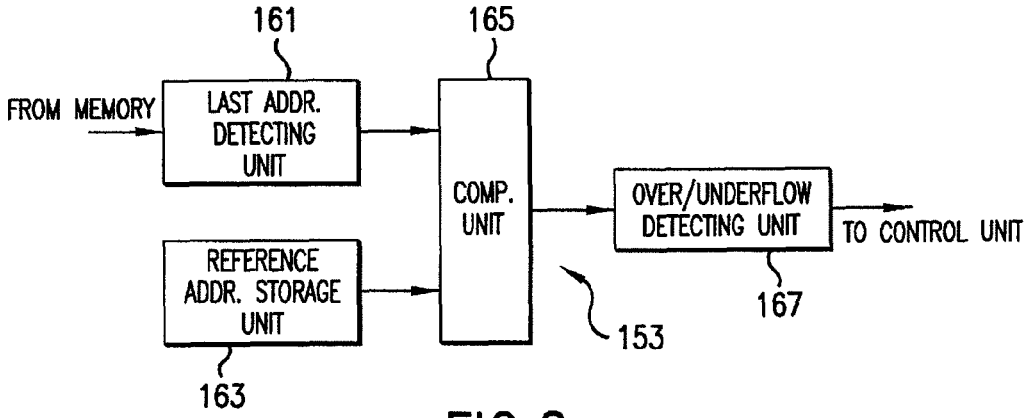
FIG. 8 is an internal block diagram showing a data storage volume detecting unit 153 illustrated in FIG. 7.

FIG. 8 is an internal block diagram showing the data storage volume detecting unit 153 illustrated in FIG. 7. As shown in FIG. 8, the data storage volume detecting unit 153 comprises: a last address detecting unit 161 for detecting the last address stored in the memory 143; a reference address storage means 163 for storing a reference address which will be compared with the last address stored in the memory 143 to detect an overflow/underflow; a comparing unit 165 for comparing an address detected by the last address detecting unit 161 with the reference address stored in the reference address storage means 163; and an overflow/underflow detecting unit 167 for detecting the overflow/underflow of the memory 143 based on the comparison of the comparing unit 165. The subunits of the data storage volume detecting unit 153 may be implemented as software as well as hardware.

The detecting operation of the storage volume of the data stored in the memory 143 by the data storage volume detecting unit 153 is now described with reference to FIG. 8. The comparing unit 165 compares the last address detected by the last address detecting unit 161 with the reference address of the reference address storage unit 163, and outputs an comparing signal used to control whether the overflow/underflow detecting unit 167 outputs an overflow/underflow state signal.

Figure 9:
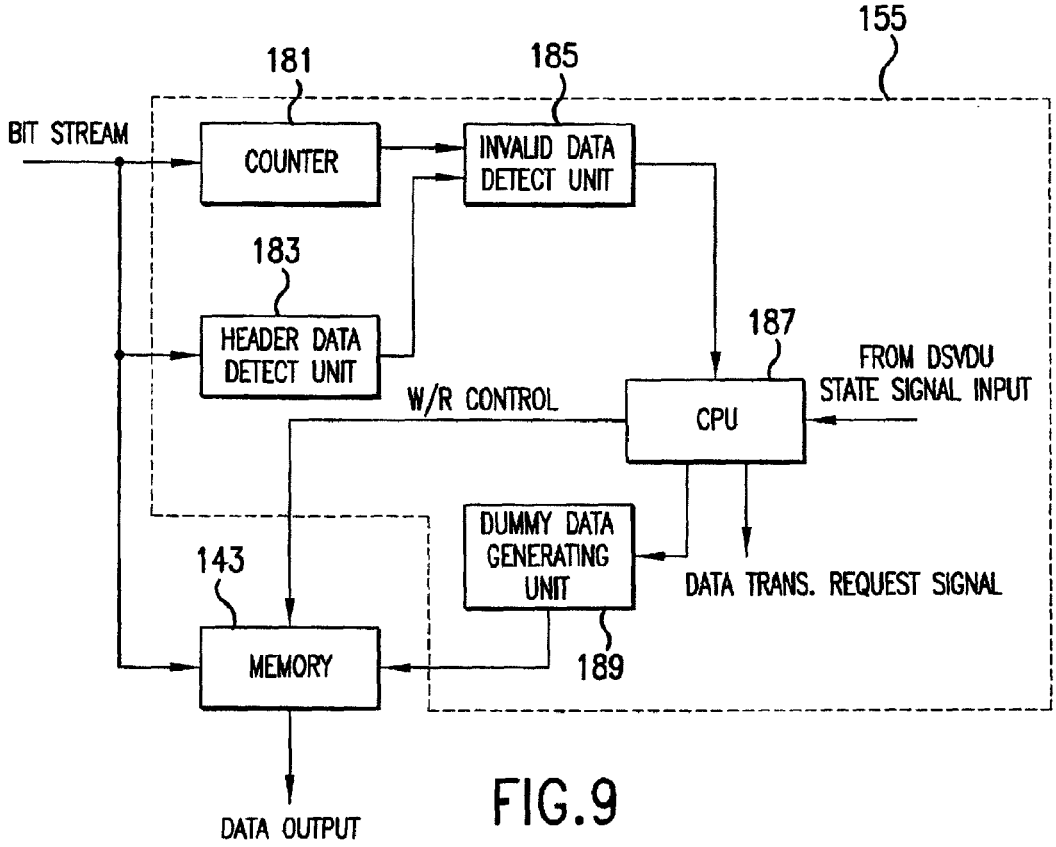
FIG. 9 is a detailed block diagram showing an control unit 155 illustrated in FIG. 7, according to a first preferred embodiment of the present invention.

FIG. 9 is a detailed block diagram showing the control unit 155 illustrated in FIG. 7. As shown in FIG. 9, the control unit 155 comprises: a counter 181 for counting bytes of the audio data output from the bit stream analyzing unit 151; a header data detecting unit 183 for detecting the header data from the audio data output from the bit stream analyzing unit 151; and an invalid data detecting unit 185 for detecting invalid data by based on the result of the counter 181 and the header data detecting unit 183.

The control unit 155 further comprises a Central Processing Unit (CPU) 187 for controlling a read/write operation into both a dummy data generating unit 189 and the memory 143 based on output signals of the invalid data detecting unit 185. Also, the CPU 187 outputs the data transmitting stopping signal or the data transmitting request signal to the navigator 117 in response detection of an overflow/underflow by DSVDU 153.

When the audio signal detected in the invalid data detecting unit 185 is less than one normal frame (1536 bytes), the CPU 187 controls the dummy data generating unit 189 to generate dummy data which is stored in the memory 143 to make a complete normal frame. That is, by mixing the dummy data, the length of the input audio signal is adjusted into one normal frame.

On the other hand, when the audio signals detected in the invalid data detecting unit 185 is longer than one normal frame, the CPU 187 turns off data writing into the memory 143, effectively preventing any audio signals beyond one normal frame (1536 bytes) to be written from the bit stream analyzing unit 151 into the memory 143. Selectively, if the audio signals beyond one normal frame (1536 bytes) are already written, the CPU 187 may control the memory 143 so that the audio signals are overwritten by the audio signals of the next frame.

Figure 10:
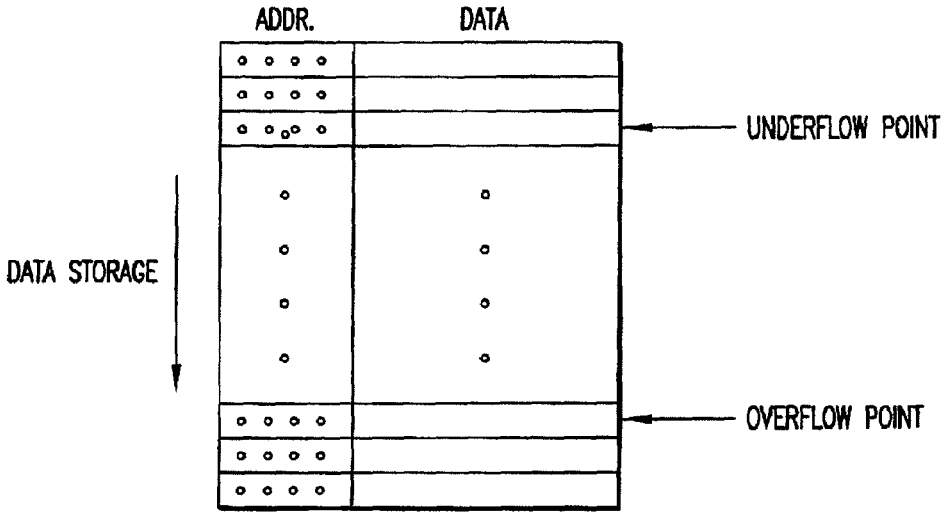
FIG. 10 is a state diagram showing a memory 143 illustrated in FIG. 6.

FIG. 10 is a state diagram showing the memory 143 of the audio decoding circuit 127 illustrated in FIG. 6. The reference address storage unit 163 (shown in FIG. 8) stores the reference addresses corresponding to the underflow point and overflow point, which addresses depend on the size of the memory 143. The overflow/underflow detecting unit 167 outputs an overflow state signal when the address of the last data stored in the memory 143 is over the reference address corresponding to the overflow point, and an underflow state signal when the last address of the data stored in the memory 143 is under the reference address corresponding to the underflow point.

According to the overflow/underflow state signal detected from the overflow/underflow detecting unit 167, as shown in FIG. 8, the control unit 155 outputs the data transmitting stopping signal/data transmitting request signal. Undesired errors, which are otherwise generated by the memory 143 of the audio decoding circuit 127, are therefore prevented. Consequently, the memory 143 can be used most efficiently.

In the following, the method for compensating the reproduced audio signals of the optical disc according to the present invention will be described in detail.

Figure 1:
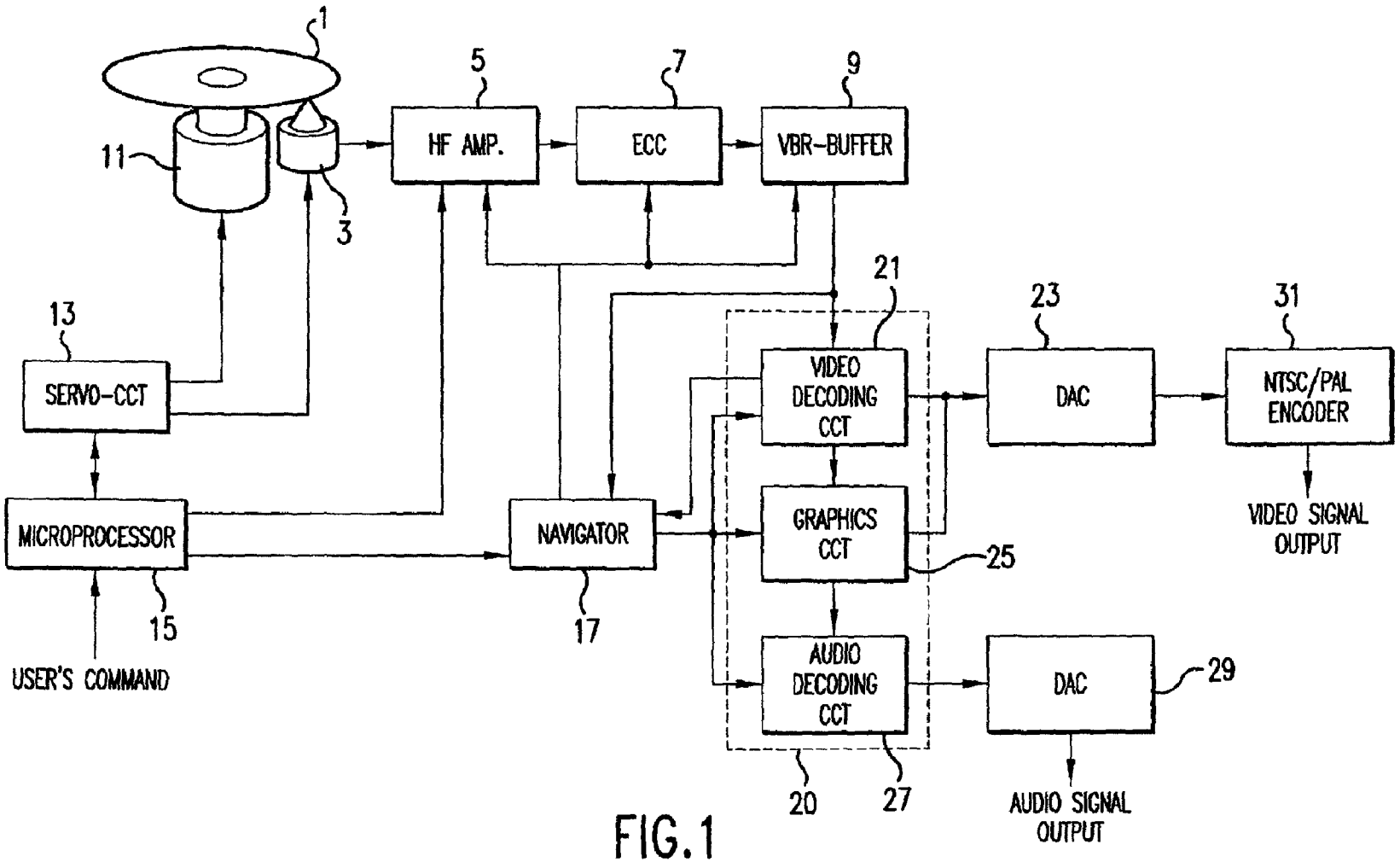
FIG.1 CONVENTIONAL ART
FIG. 1 is a block diagram of a conventional reproduction apparatus of an optical disc.
Figure 2:
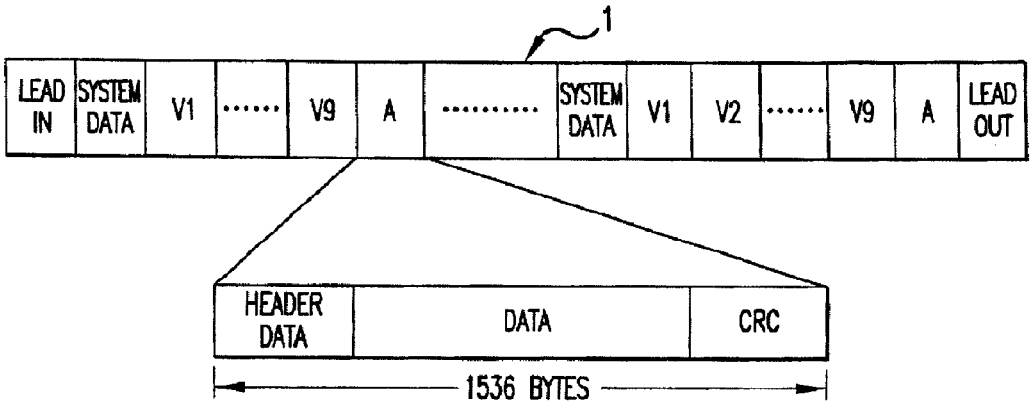
FIG.2 CONVENTIONAL ART
FIG. 2 is a diagram of memory space configured for a conventional DVD system.
Figure 3A:
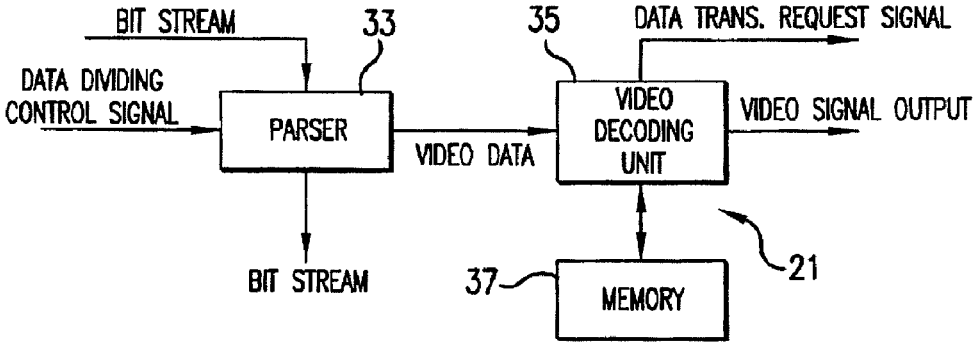
FIG.3A CONVENTIONAL ART
FIG. 3A is a block diagram showing the video decoding circuit 21 illustrated in FIG. 1.
Figure 3B:
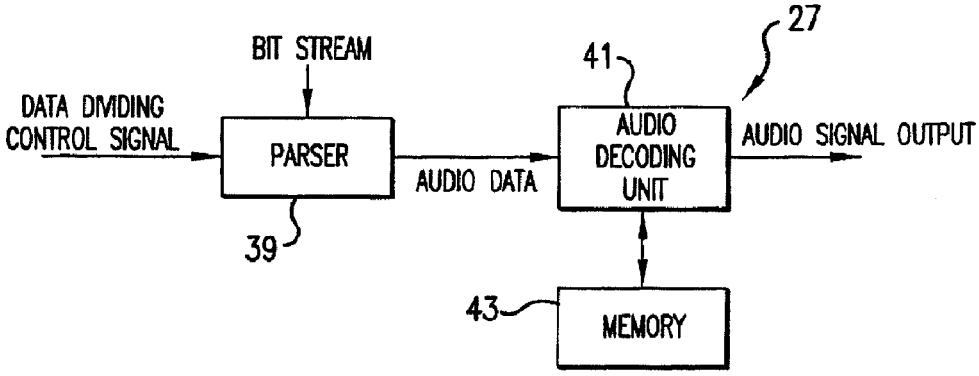
FIG.3B CONVENTIONAL ART
FIG. 3B is a block diagram showing the audio decoding circuit 27 illustrated in FIG. 1.
Figure 4A:
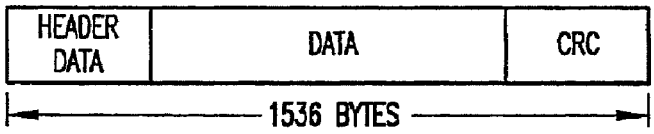
FIG.4A CONVENTIONAL ART
FIG. 4A shows the formation of normal audio data having a size corresponding to one normal frame.
Figure 4B:
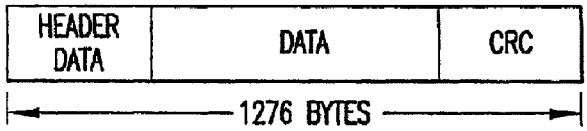
FIG.4B CONVENTIONAL ART
FIG. 4B shows the formation of invalid audio data having a size smaller than one normal frame.
Figure 4C:
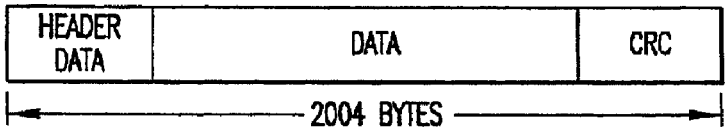
FIG.4C CONVENTIONAL ART
FIG. 4C slows the formation of invalid audio data having a size larger than one normal frame.

As shown in FIG. 2, the DVD 1 records user data composed of the video/audio data, and system data used during the reproduction of the user data. With reference to FIG. 5, these data are read and reproduced as signals by the optical pick-up apparatus 103. The reproduced signals are output after being amplified in the high frequency amplifying circuit 10. The signals output from the high frequency amplifying circuit 105 are corrected by ECC 107, and output to VBR buffer 109 where they are temporarily stored.

The VBR buffer 109 generates a bit stream based on the signals temporarily stored therein. The bit stream is input from VBR buffer 109 into the navigator 117 and data decoding circuit unit 120. Navigator 117 decodes the signals of the system data and then executes the data dividing controlling operation. That is, the navigator 117 controls the data decoding circuit unit 120 so that the bit stream is decoded by he video decoding circuit 121 if the input bit stream represents the video data, and the bit stream is decoded by he audio decoding circuit 127 if the bit stream represents audio data. Similarly, the bit stream is decoded by the graphics circuit 125 if the bit stream represents caption data.

With reference to the audio decoding circuit 127 in FIG. 6, the audio decoding unit 141 in FIG. 7 and the control unit 155 in FIG. 9, the extracting operation of the audio decoding circuit 127 and its signal-processing operation will be explained.

First, the navigator 117 determines the types of signals represented by the bit stream input from VBR buffer 109. When the signals in the bit stream represent the audio data, the navigator 117 controls the audio decoding circuit 127 to input the bit stream received by the parser 139 of the audio decoding circuit 127 into the audio decoding unit 141. The audio data being input into the audio decoding unit 141 is analyzed in the bit stream analyzing unit 151, and then stored in the memory 143.

In the above process of reproducing the optical disc, the data stored on the optical disc is processed in units of frames. When the audio data is being stored in the memory 143, the control unit 155 determines whether the reproduced signals of the audio data signals having the length of one normal frame. If the length of the reproduced signals of the audio data is not of normal length (i.e., is not 1536 bytes), the control unit 155 executes the operation for compensating the length of the reproduced audio signals to adjust the reproduced signals to signals is of one normal frame.

Figure 11:
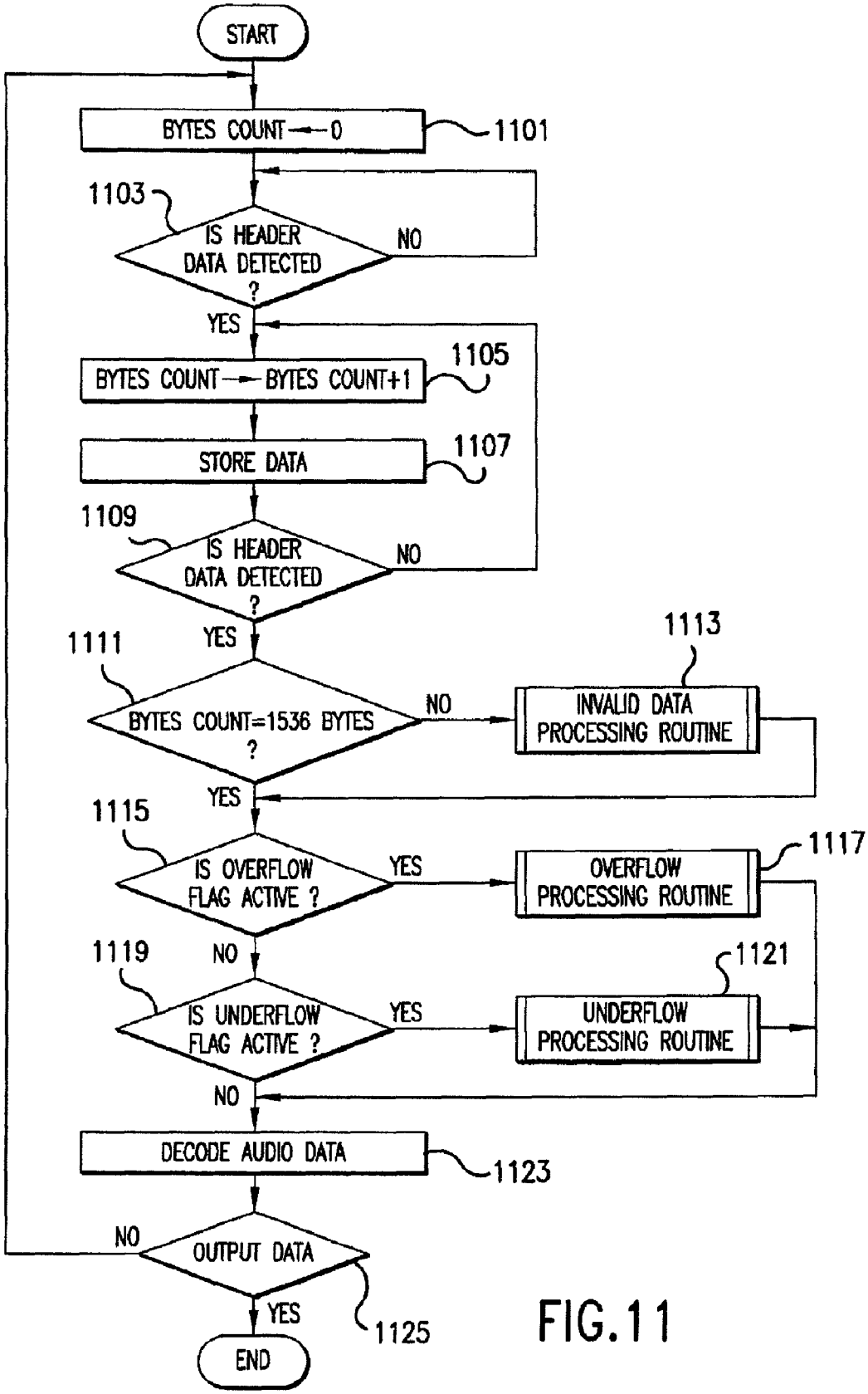
FIG. 11 is a flow chart for the method of compensating reproduced audio signals in the audio decoding circuit 127, according to the present invention.
Figure 12:
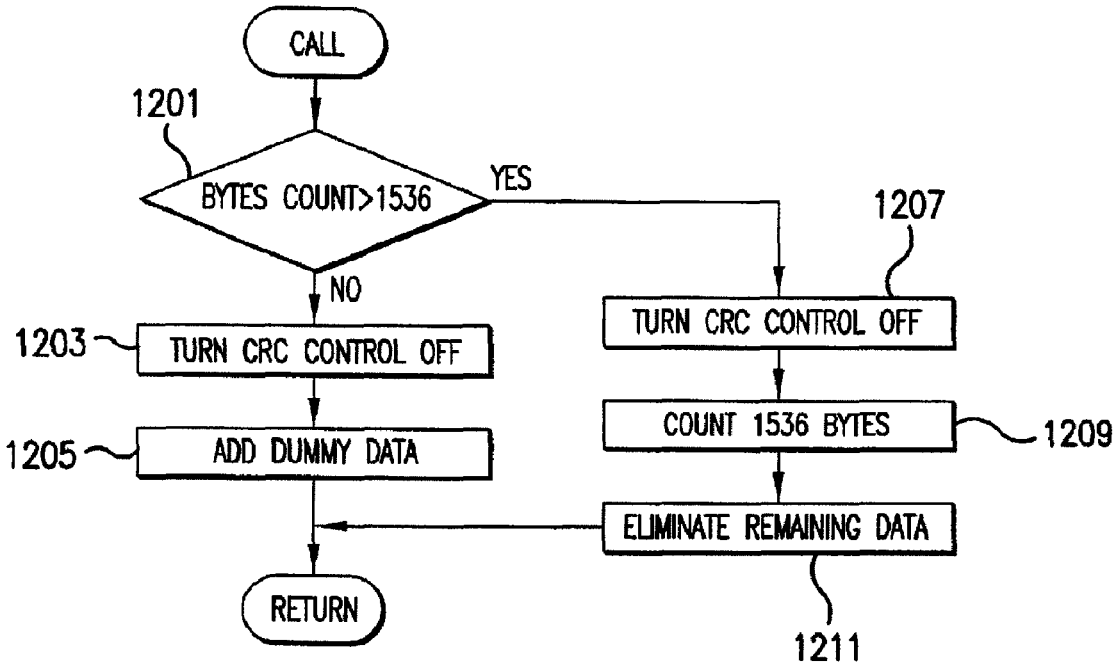
FIG. 12 is a flow chart showing an invalid data processing routine illustrated in FIG. 11.
Figure 13:
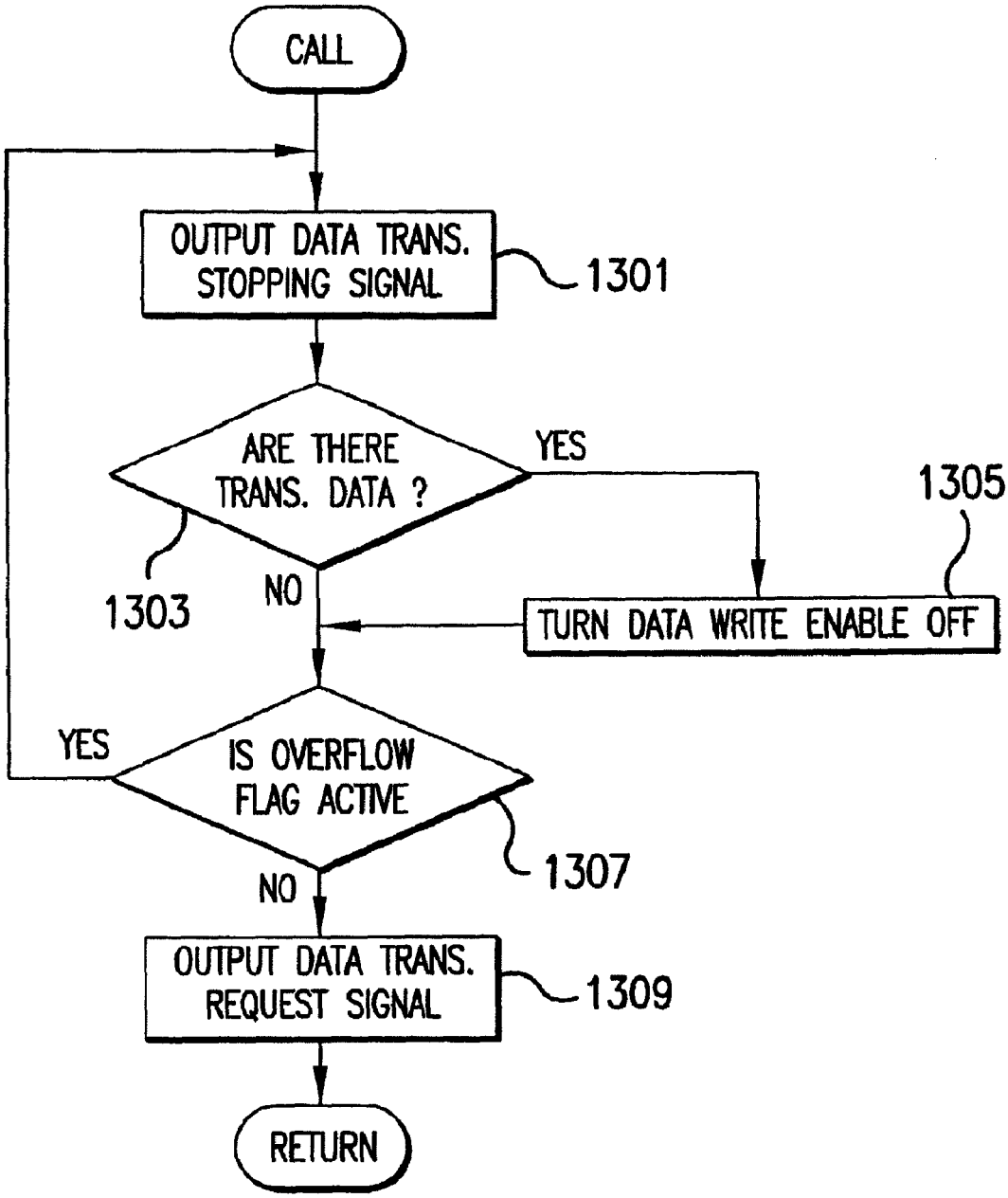
FIG. 13 is a flow chart showing an overflow processing routine illustrated in FIG. 11.
Figure 14:
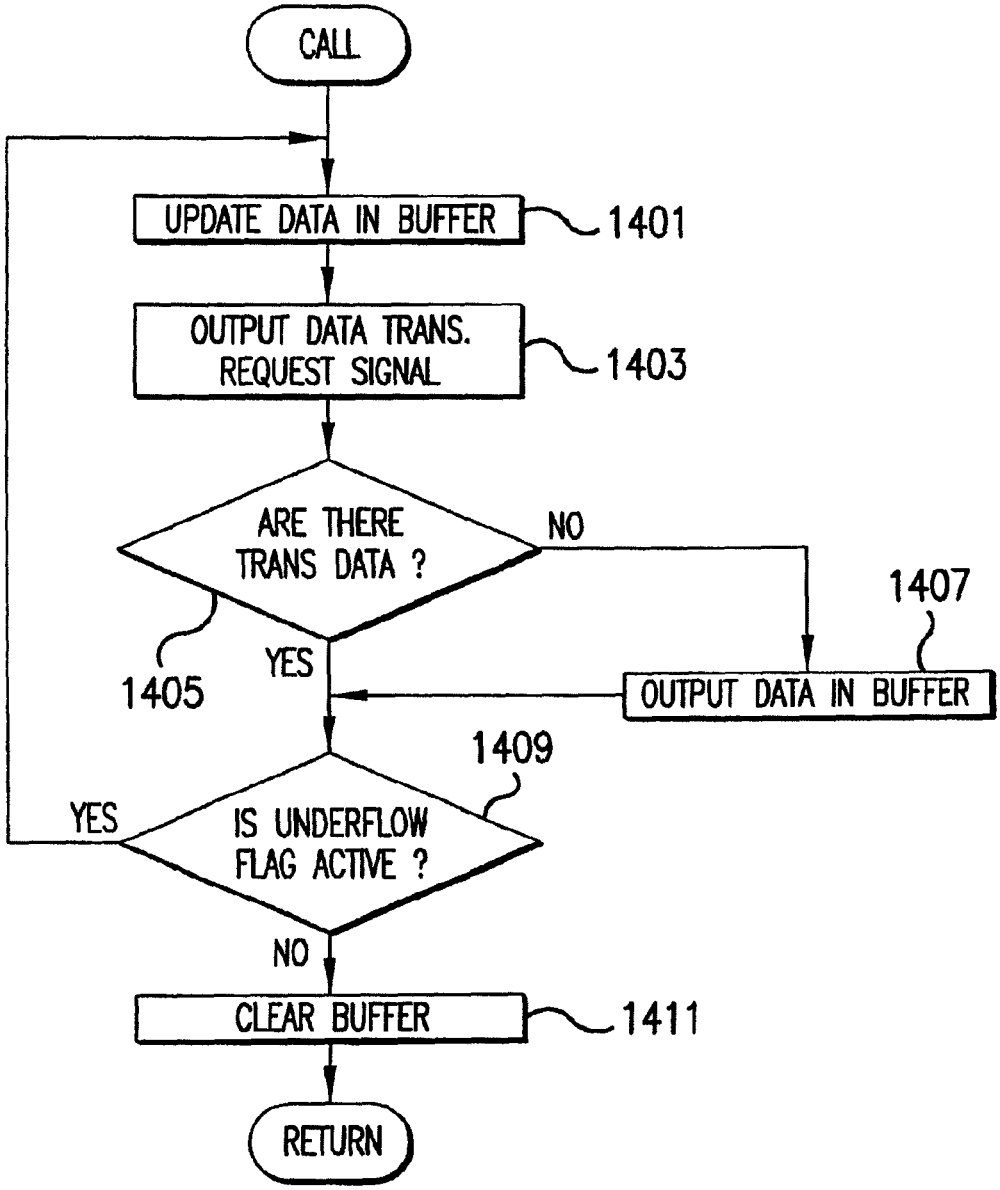
FIG. 14 is a flow chart showing an underflow processing routine illustrated in FIG. 11.

FIG. 11 is a flow chart illustrating the method for compensating the reproduced audio signals in the audio decoding circuit 127 according to the present invention. FIG. 12 is a flow chart showing the method of processing of the invalid data illustrated in FIG. 11. FIG. 13 is a flow chart showing the method of processing an overflow condition illustrated in FIG. 11. FIG. 14 is a flow chart showing the method of processing according to an underflow illustrated in FIG. 11.

As shown in FIG. 11, the initial value of the bytes counter 181 is set to '0' (zero) (step 1101), and the header data detecting unit 183 detects header data from audio data output by bit stream analyzing unit 151 (step 1103).

As illustrated in FIG. 2, one frame of audio data typically includes 1536 bytes of data, including header data, user data and an error correcting codes (e.g., Cyclic Redundancy Code CRC). The header data is placed before the user data which may be either one of the video/audio signals, and the user audio data is placed after the header data. Thus, the detection of the header data may be used to determine beginning of the one frame of audio data.

When the header data is detected in step 1103, the bytes counter 181 counts the bytes of the data being output by the bit stream analyzing unit 151 (step 1105), and the memory 143 stores the audio data output by the bit stream analyzing unit 151 (step 1107).

The steps of counting the bytes of the audio data received from VBR buffer 109 and of concurrently storing that audio data in the memory 143 (steps 1105 and 1107) are repeatedly executed until the header data of next frame is detected by the header data detecting unit 183 (step 1109).

Referring again to FIG. 9, the bytes counter 181 and header data detecting unit 183 send data to CPU 187 via invalid data detecting unit 185. In addition, bytes counter 181 transmits a counting result, and header data detecting unit 183 transmits a detecting signal. The invalid data detecting unit 185 detects whether the audio data input is invalid data or normal data by counting the bytes of the data input until the header data of the next frame is detected (step 1111), normal data having a length equal to one normal frame (1536 bytes).

If the number of bytes in a frame of audio data is determined by counter 181 to exceed 1536 bytes in said step 1111, the audio data is determined to be invalid data. When the audio data is determined to be invalid, it is processed by the CPU 187 (step 1113). In other words, the processing of the invalid data in the step 1113 will be executed when the length of the one frame of the audio data input is not 1536 bytes.

FIG. 12 shows the processing of the invalid data illustrated in FIG. 11. While processing invalid data, it is first determined whether the invalid frame of audio data received from VBR buffer 109 is larger or smaller than 1536 bytes (step 1201). If it is determined that the invalid frame of audio data is smaller than 1536 bytes in step 1201, the CPU (refer to FIG. 9) turns off the error correcting code(CRC) in order not to execute the correction of errors included in the audio data (step 1203). Meanwhile, the CPU 187 controls the dummy data generating unit 189 to generate the dummy data, and then stores the generated dummy data into the memory 143 (step 1205). The dummy data will be repeatedly generated and stored until the audio data reaches 1536 bytes.

On the other hand, if it is determined that the invalid frame of audio data is larger than 1536 bytes by step 1201, the CPU (refer to FIG. 9) turns off the error correcting code(CRC) in order not to execute the correction of errors included in the audio data (step 1207). Meanwhile, the CPU counts the audio data input, and removes the data following the 1536 th byte (step 1211). The remaining data may be removed by discontinuing writing function to the memory 143 in the step of storing the audio data into the memory 143, effectively halting storage of the remaining data in the memory 143. Alternatively, the remaining data may be removed by overwriting the remaining data with the audio data of the next frame, if the remaining data has already been stored in the memory.

Once the audio data is adjusted so that the length of one frame of the audio data is 1536 bytes in step 1205 or step 1211, the processing of the invalid data is terminated, and the reproduction process returns to step 1115 in FIG 11. If the above-described processing of the invalid data is executed, the length of one resulting frame audio data will become one normal frame length (1536 bytes).

At step 1115, the CPU 187 continuously monitors, during the course of storing the audio data in the memory 143, whether an interrupt signal indicating overflow of the memory 143 is input from the data storage volume detecting unit 153. Additionally, the CPU 187 continuously monitors whether an interrupt signal indicating underflow of the memory 143 is input from the data storage volume detecting unit 153 (step 1119).

The overflow and underflow of the memory 143 is detected (in step 1115) by the data storage volume detecting unit 153, as shown in FIGS. 7 and 8, based on the storage volume of the data stored in the memory 143 as follows. First, the last address detecting unit 161 detects the address of the last data having been stored in the memory 143, and outputs the detected last address to the comparing unit 165. The comparing unit 165 compares the last address with the reference addresses for overflow and underflow, respectively. The overflow/underflow detecting unit 167 outputs the interruption signal of either overflow or underflow based on the current storage volume of the data stored in the memory 143. The interruption signal is input into the CPU 187, and according to the respective interruption signal the CPU 187 outputs the data transmitting stopping signal or the data transmitting request signal to the navigator 117.

Thus, detection of memory 143 overflow in said step 1115 means that excessive data is stored in the memory 143 and that the address detected by the last address detecting unit 161 is over the reference address, i.e., the memory 143 has overflowed. Therefore, the CPU 187 outputs the data transmitting stopping signal to the navigator 117.

So long as an interruption signal indicating an overflow of the memory 143 is being output from the data storage volume detecting unit 153, the CPU 187 executes an overflow processing routine as indicated by step 1117. The overflow processing routine of step 1117 is executed when the storage volume of the data stored in the memory 143 of the audio decoding circuit 127 is over a predetermined value.

FIG. 13 shows, in more detail, the overflow processing routine illustrated in FIG. 11. In that routine, the CPU 187 outputs the data transmitting stopping signal to the navigator 1117 (step 1301). The CPU 187 then determines whether the bit stream analyzing unit 151 transmits any audio data (step 1303). If audio data is transmitted, the CPU 187 turns off the writing of the memory 143, thereby inhibiting the writing of the memory with the transmitted audio data (step 1305). If audio data is not transmitted, the CPU 187 examines whether the overflow of the memory 143 continues (step 1307). If the overflow flag of the memory 143 remains active, the reproduction process returns to the step 1301, and steps 1301 to 1307 are repeated.

While the above-described process is executed, the data storage volume detecting unit 153 detects the storage volume of the data stored in the memory 143 and outputs state signals to the CPU 187. If it is concluded that the overflow of the memory 143 is released by the state signal, the CPU 187 outputs the data transmitting request signal to the navigator 117. Simultaneously, the writing operation is resumed to store the audio data being output from the bit stream analyzing unit 151 into the memory 143 (step 1309). Thus, the processing of the overflow ends and the reproduction process returns to step 1119 in FIG. 11.

The fact that the memory 143 is underflowed in step 1119 means that the address detected by the last address detecting unit 161 is less than the reference address for underflow, and there exists an excess amount of vacant storage space in the memory 143. Therefore, the overflow/underflow detecting unit 167 outputs the interruption signal of underflow to the CPU 187, and the CPU 187 outputs the data transmitting request signal to the navigator 117. More specifically, if the memory 143 is in underflow, the CPU 187 executes the data processing operation according to the processing of the underflow processing routine (step 1121).

FIG. 14 shows in more detail the processing of the an underflow situation illustrated in FIG. 11. The CPU 187, in the initial stage of the processing of the underflow, stores the audio data being output from the bit stream analyzing unit 151 into the buffer in the unit 151, and updates the buffer (step 1401). The CPU 187 then outputs the data transmitting request signal to the navigator 117 (step 1403). The CPU 187 determines whether there is any audio data transmitted by said step 1403 (step 1405). If audio data is transmitted, the CPU 187 continues to store the audio data into the memory 143. If no audio data is transmitted, the CPU 187 outputs the data stored in the buffer, which data is stored into the memory 143 (step 1407). That is, a portion of audio data previously received is redundantly stored in memory 143 during an underflow condition if no new data is transmitted. Alternatively, dummy data, a default data pattern, or an average of some group of previously transmitted or stored audio data may be stored in memory 143 under such conditions.

During the execution of the above-described process, the CPU 187 examines whether the underflow condition of the memory 143 remains or not (step 1409). If the underflow condition remains, the reproduction process returns to the step 1401, and said steps 1401 to 1409 are repeated. While the underflow condition remains without any transmitted data, the data stored in the buffer is repeatedly output and stored in the memory 143.

Once the underflow of the memory 143 is released by the state signal output from the data storage volume detecting unit 153, the CPU 187 clears the buffer (step 1411), and the processing of the underflow ends so that the reproduction process returns to step 1123 in FIG. 11.

The multiplexer 157 and the IDCT 159 are used to decode audio signals being output from the memory 143 into decoded audio data corresponding to the original signals based on a time-frequency converting method (refer to FIG. 7) (step 1123). The decoded audio data is then output to the audio digital/analog converter 129 (refer to FIG. 5). The decoded audio signal data being output from the audio decoding circuit 127 is then converted into analog signals by the audio digital/analog converter 129, before being output to the speaker, etc. (not shown in the attached drawings).

Figure 15:
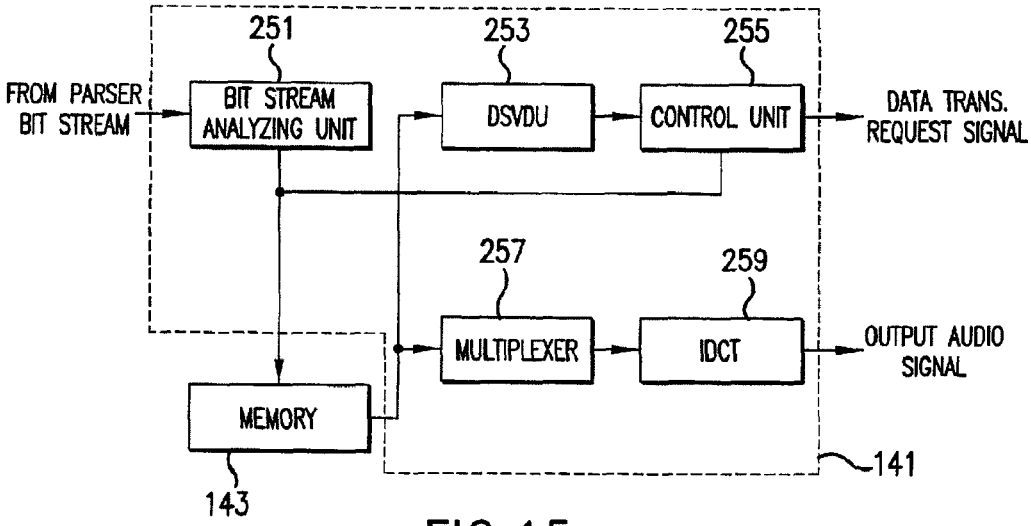
FIG. 15 shows a selective preferred embodiment of an audio decoding unit 141 according to the present invention when the overflow or underflow is generated in the memory 143.

FIG. 15 shows the audio decoding unit 141 of a second preferred embodiment of the present invention. As shown in FIG. 15, the bit stream analyzing unit 251 analyzes data in the bit stream input from the parser 139, the analyzed data being temporarily stored in the memory 143. The bit stream output from the bit stream analyzing unit 251 is input into the control unit 255, where the length of the audio data input is compared with the length of one normal frame. The data storage volume detecting unit 253 detects the data storage volume of the audio data output from the memory 143, and outputs a state signal according to the data storage volume detected.

In accordance with the state signal, the control unit 255 generates the audio data transmitting request signal or the audio data transmitting stopping signal. The audio data output from the memory 143 is decoded by the multiplexer 257 and IDCT 259, and the decoded data is output.

The audio decoding unit 141 according to the second preferred embodiment generates a data transmitting request signal if a minimum predetermined amount of vacant storage space exists in the memory 143, and generates a data transmitting stopping signal if maximum predetermined amount of vacant storage space does not exist in the memory 143. That is, according to the second preferred embodiment, a data transmitting stopping signal can be sent to the navigator 117 to inhibit the supply of data into the audio decoding circuit 127 when an overflow condition exists in the memory 143, and a data transmitting request signal can be sent to the navigator 117 to request data when an underflow condition exists in the memory 143. However, the controlling operation of the audio decoding unit 141 of the first preferred embodiment (FIG. 7), by which the dummy data is directly and repeatedly stored in, or output from, the memory 143, is impossible according to this preferred embodiment.

Figure 16:
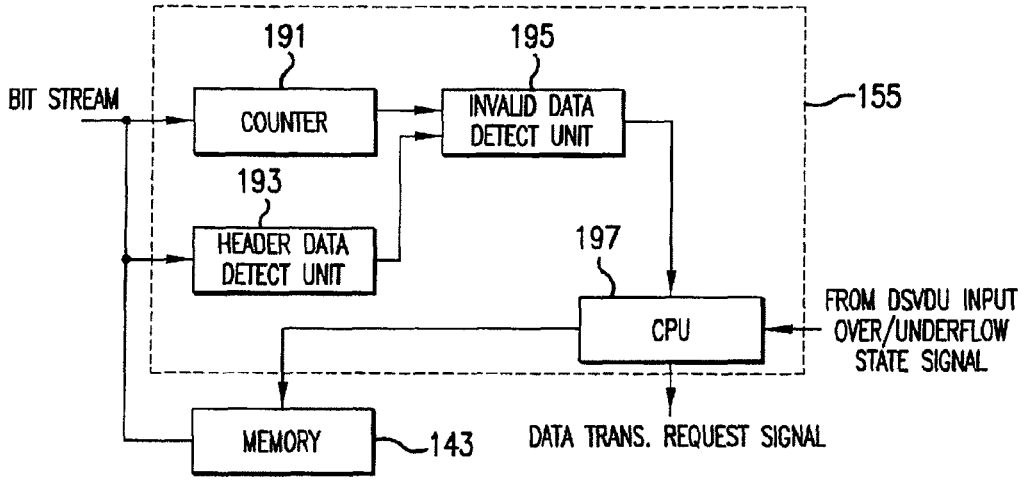
FIG. 16 shows a selective preferred embodiment of the control unit 155 according to the present invention illustrated in FIGS. 7.

FIG. 16 shows the control unit 155 of a third preferred embodiment of the present invention. As shown in FIG. 16, the control unit 155 according to this preferred embodiment comprises: a counter 191 for counting the bytes of the audio data being output from the bit stream analyzing unit 151; a header data detecting unit 193 for detecting the header data from the audio data being output from the bit stream analyzing unit 151; and an invalid data detecting unit 195 for detecting invalid data upon receiving detecting signal output from the header data detecting unit 193.

Also, the control unit 155 of this preferred embodiment comprises a Central Processing Unit (CPU) 197 for controlling the read or write operation into the memory 143 based on signals output from the invalid data detecting unit 195, and for outputting a data transmitting stopping signal or a data transmitting request signal to the navigator 117 according to the overflow/underflow state signal detected in the data storage volume detecting unit 153.

No separate dummy data generating unit 189 exist in the control unit 155 of this preferred embodiment. Therefore the CPU 197 adjusts invalid data to the normal data having one normal frame length by storing the data input into the memory 143 previously repeatedly or by inserting the dummy data into the invalid data (refer to FIG. 17C). In this regard, the dummy data may be inserted by well-known methods, for example, by inserting a desirable portion of a sample wave into the invalid data. It should be obvious to those skilled in the art that the tone quality of the signals according to the above method can be made to be substantially similar from original signals. When the length of the audio data input is longer than the length of the data of the one normal frame, as in FIG. 9, the storage of the data exceeding a normal frame will be inhibited.

FIGS. 17A-17F are diagrams showing the output waveforms of invalid data and the compensated audio signals when the invalid data are input.

Figure 17A:
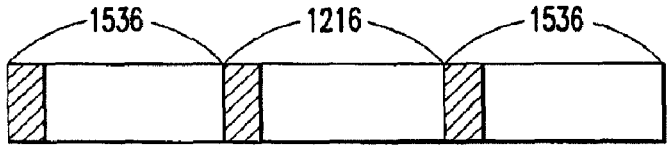
FIGS. 17A-17F are diagrams showing output waveforms of invalid and compensated audio signals.
Figure 17B:
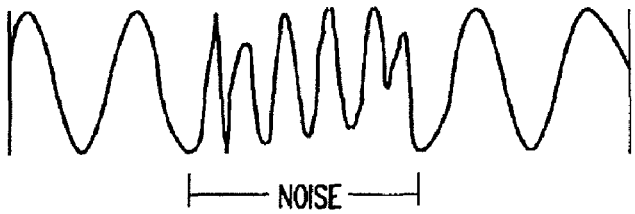

As shown in FIG. 17A, when an invalid data whose length is less than the normal length (e.g., 1216 bytes) is input, signals of abnormal waveforms will be output absent compensation, as shown in FIG. 17B. That is, noise occurs at the portion of the signal representing invalid data.

Figure 17C:
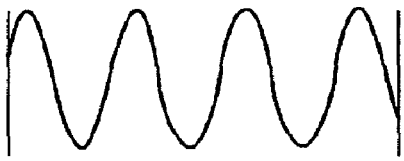

According to the present invention, invalid data whose length is greater than the normal length may be monitored and neutralized by either inhibiting storage of that data into the memory 143 during the writing operation or by removing that data during the reading operation, as shown in FIG. 17C.

Figure 17D:
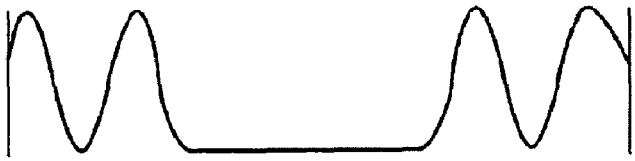

When invalid data has a length of less than the normal length, the portion of the signal representing invalid data may be replaced with dummy data, muted data, or data representing previously stored data. If invalid data is replaced with muted data, as shown in FIG. 17D, the memory's writing operation will be turned off while the invalid data is input into the memory 143, so that the invalid data will be replaced by muted data, e.g., in a signal mute unit (not shown in the attached drawings). For instance, such a single mute unit can be used in place of dummy data generating unit 189 in FIG. 9. That is, instead of storing dummy data using dummy data generating unit 189, a signal muting unit may be used to store muted data. The muted data may be added to the invalid audio data before storage of that audio data, the muted data may be stored in place of the invalid audio data.

Figure 17E:
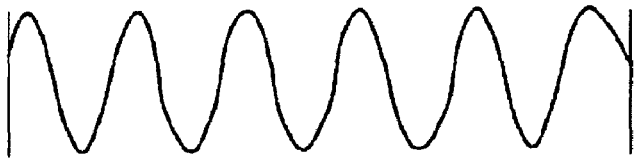
Figure 17F:
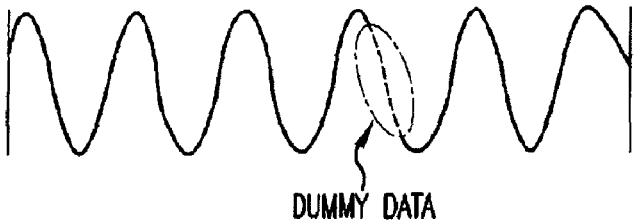

FIG. 17E shows waveform of reproduced audio signals compensated in accordance with that above-described preferred embodiment of the present invention, in which the output of the audio data is adjusted when an underflow condition is detected by repeatedly outputting the data stored in the memory 143. Also, FIG. 17F shows output waveform of the data to which a dummy data is added as described previously. For instance, when the invalid data is input having a length of 1216 bytes, which is smaller than one normal frame (1536 bytes), this preferred embodiment of the present invention adjusts the invalid data to normal length by adding dummy data to the invalid data.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefor, it is intended that the present invention not be limited to the particular embodiment disclosed as the best mode contemplated for carrying out the present invention, but that the present invention includes all embodiments falling within the scope of the appended claims.

The foregoing description and the drawings are regarded as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example, for the purposes of a continuation or divisional application.

What is claimed is:

[1. A method for controlling an audio memory of an audio decoding circuit included in a data decoding unit having a video decoding circuit, said method comprising:

detecting an amount of data stored in said audio memory, and an address of a last audio data stored in said audio memory;

comparing the detected address of the last audio data stored in said audio memory with a reference address, which corresponds to a predetermined lower threshold for said amount of data stored in said audio memory, and determining whether said amount of data stored in said audio memory is less than said predetermined lower threshold based on the comparison of the detected address with the reference address; and requesting additional audio data to be stored into said audio memory independently of processing in the video decoding circuit when said amount of data stored in said audio memory is less than said predetermined lower threshold.]

[2. The method recited by claim 1, further comprising:

storing data that is representative of previously stored audio data when additional audio data is not available for storage into said audio memory while said amount of data stored in said audio memory is less than said predetermined lower threshold.]

[3. The method recited by claim 1, further comprising:

storing dummy data into said audio memory while said amount of data stored in said audio memory is less than said predetermined lower threshold.]

[4. An apparatus for controlling an audio memory of an audio decoding circuit included in a data decoding unit having a video decoding circuit, said apparatus comprising:

a volume detecting unit for detecting an amount of data stored in said audio memory, said volume detecting unit comprising a last address detecting unit for detecting an address of a last audio data stored in said audio memory;

a comparing unit for comparing the detected address of the last audio data stored in said audio memory with a reference address, which corresponds to a predetermined lower threshold for said amount of data stored in said audio memory, and determining whether said amount of data stored in said audio memory is less than said predetermined lower threshold based on the comparison of the detected address with the reference address; and a controller including a signal generator, said signal generator generating a data transmission request signal requesting additional audio data to stored into said audio memory independently of processing in the video decoding circuit when said amount of data stored in said audio memory is less than said predetermined lower threshold.]

[5. The apparatus recited by claim 4, wherein said controller stores data that is representative of previously stored audio data when additional audio data is not available for storage into said audio memory while said amount of data stored in said audio memory is less than said predetermined lower threshold.]

[6. The apparatus recited by claim 4, wherein said controller further includes a dummy data generator for generating dummy data to be stored in said audio memory while said amount of data stored in said audio memory is less than said predetermined lower threshold.]

[7. A method for controlling an audio memory of an audio decoding included in a data decoding unit having a video decoding circuit, said method comprising:

detecting an amount of data stored in said audio memory by detecting an address of a last audio data stored in said audio memory;

comparing the detected address of the last audio data stored in said audio memory with a reference address, which corresponds to a predetermined upper threshold for said amount of data stored in said audio memory, and determining whether said amount of data stored in said memory is greater than aid predetermined upper threshold based on the comparison of the detected address with the reference address; and generating a data transmission stopping signal independently of processing in the video decoding circuit when said amount of data stored in said audio memory is greater than said predetermined upper threshold until said amount of data stored in said audio memory is less than or equal to said predetermined upper threshold.]

[8. The method recited by claim 7, further comprising:

halting storage of additional audio data in said memory when said amount of data stored on said memory is greater than said predetermined upper threshold.]

[9. An apparatus for controlling an audio memory of an audio decoding circuit included in a data decoding unit having a video decoding circuit, said apparatus comprising:

a volume detecting unit for detecting an amount of data stored in said audio memory, wherein said volume detecting unit comprising a last address detecting unit for detecting an address of a last audio data stored in said audio memory;

a comparing unit for comparing the detected address of the last audio data stored in said audio memory with a reference address, which corresponds to a predetermined upper threshold for said amount of data stored in said audio memory, and determining whether said amount of data stored in said audio memory is greater than said predetermined upper threshold based on the comparison of the detected address with the reference address; and a controller including a signal generator, said generator generating a data transmission stopping signal independently of processing in the video decoding circuit when said amount of data stored in said audio memory is greater than said predetermined upper threshold until said amount of data stored in said audio memory is less than or equal to said predetermined upper threshold.]

[10. The apparatus recited by claim 9, wherein said controller halts storage of additional audio data in said memory when said amount of data stored on said memory is greater than said predetermined upper threshold.]

*11. A method for decoding a compensated audio data by controlling an audio memory of an audio decoding circuit included in a data decoding unit having a video decoding circuit, said method comprising:*

*decoding, by the audio decoding circuit, the compensated audio data, wherein compensating the audio data comprises:*

*detecting invalid data based on count information associated with the audio data; and*

*generating dummy data based on the detecting of the invalid data, the dummy data being repeatedly generated until audio data reaches a predefined length of bytes,*

*said decoding comprising:*

*detecting an amount of data stored in said audio memory, the detecting of the amount of data stored in said audio memory comprising:*

*detecting an address of a last audio data stored in said audio memory,*

*comparing the detected address of the last audio data stored in said audio memory with a reference address corresponding to a predetermined lower threshold for said amount of data stored in said audio memory, and*

*determining whether said amount of data stored in said audio memory is less than said predetermined lower threshold based on the comparison of the detected address with the reference address; and*

*requesting additional audio data to be stored into said audio memory independently of processing in the video decoding circuit when said amount of data stored in said audio memory is less than said predetermined lower threshold.*

*12. The method of claim 11, wherein the count information indicates a length of the audio data.*

*13. The method of claim 11, wherein the decoding includes an inverse discrete cosine converting transformation.*

* * * * *